United States Patent [19]
Holmes

[11] Patent Number: 4,537,738
[45] Date of Patent: Aug. 27, 1985

[54] PROCESS FOR ORIENTING PARTIALLY CRYSTALLIZED 3-HYDROXYBUTYRATE POLYMERS

[75] Inventor: Paul A. Holmes, Middlesbrough, England

[73] Assignee: Imperial Chemical Industries PLC, London, England

[21] Appl. No.: 524,314

[22] Filed: Aug. 18, 1983

[30] Foreign Application Priority Data

Aug. 27, 1982 [GB] United Kingdom ............... 8224683

[51] Int. Cl.³ ............................................. D01D 5/12
[52] U.S. Cl. ............................. 264/210.5; 264/210.1; 264/235.6
[58] Field of Search ............... 264/235.6, 210.1, 210.5; 528/361

[56] References Cited

U.S. PATENT DOCUMENTS 4,360,488 11/1982 Barham et al. .................... 264/210.1
4,427,614 1/1984 Barham et al. .................... 264/210.1

Primary Examiner—Donald Czaja
Assistant Examiner—Mary Lynn Fertig
Attorney, Agent, or Firm—Cushman, Darby & Cushman

[57] ABSTRACT

3-Hydroxybutyrate polymers are formed into oriented shaped articles by drawing a partially crystallized preform to increase at least one dimension by at least 200%, and then increasing the degree of crystallization while maintaining the drawn preform in the drawn condition.

8 Claims, 1 Drawing Figure

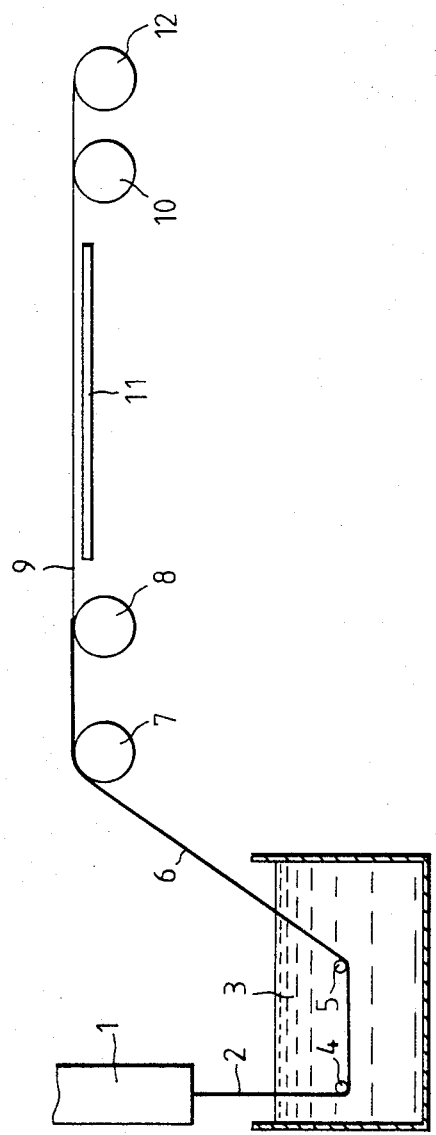

PROCESS FOR ORIENTING PARTIALLY CRYSTALLIZED 3-HYDROXYBUTYRATE POLYMERS

This invention relates to 3-hydroxybutyrate polymers.

Poly(3-hydroxybutyrate) is a thermoplastic polyester consisting of repeat units of the formula

—CH(CH$_3$).CH$_2$.CO.O— which is accumulated by many micro-organisms, particularly bacteria, for example of the genera Alcaligenes, Athiorhodium, Azotobacter, Bacillus, Nocardia, Pseudomonas, Rhizobium, and Spirillium, as an energy reserve material.

The polymer is conveniently prepared by cultivating the micro-organism in an aqueous medium on a suitable substrate, such as a carbohydrate or methanol, as an energy and carbon source. The substrate must, of course, be one that is assimilable by the micro-organism. In order to promote accumulation of the polymer, at least part of the cultivation is preferably conducted under conditions wherein there is a limitation of a nutrient that is essential for growth of the micro-organism but which is not required for polymer accumulation. Examples of suitable processes are described in European Patent Specification Nos. 15669 and 46344.

Polymers containing both 3-hydroxybutyrate units and other hydroxy-carboxylate units, such as 3-hydroxyvalerate units, can also be produced microbiologically. Thus a micro-biologically produced heteropolymer containing 3-hydroxybutyrate and 3-hydroxyvalerate residues is described in Wallen et al in "Environmental Science and Technology" 8 (1974) 576-9. Also, as described in European Patent Specification Nos. 52459 and 69497 various copolymers can be produced by cultivating the micro-organism on certain substrates, such as propionic acid which gives rise to 3-hydroxyvalerate units in the copolymer.

While cells containing the polymer can be used as such as a moulding material, for example as described in U.S. Pat. No. 3,107,172, it is generally desirable to separate the polymer from the remainder of the cell material.

Methods that have been proposed to effect this separation include breakage of the cells by methods such as treatment with actone, followed by extraction of the polymer from the broken cells by treatment with a solvent in which the polymer is soluble. Examples of such processes are described in U.S. Pat. Nos. 3,036,959 and 3,044,942 in which the solvents employed are pyridine or mixture of methylene and ethanol. Other extraction solvents for the polymer in the form in which it is produced in the cells include cyclic carbonates such as 1,2-propylene carbonate (see U.S. Pat. No. 4,101,533); chloroform (see U.S. Pat. No. 3,275,610); and 1,2-dichloroethane (as disclosed in European Patent Specification No. 15123).

U.S. Pat. No. 3,275,610 discloses other methods of cell breakage viz. ultrasonic vibration, grinding, French pressing, freezing/thawing cycles and lysozyme treatment, while as described in the aforementioned European Patent Specification No. 15123, spray or flash drying of the suspension of cells as produced by culturing the micro-organism can also cause sufficient cell breakage to enable the polymer to be extracted from the cells.

Copolymers can also be made containing units of other hydroxycarboxylic acids and/or units derived from diols, e.g. ethylene glycol, and/or dicarboxylic acids, e.g. isophthalic acid, by ester interchange occurring when the microbiologically produced polymer or copolymer is melted with such a hydroxycarboxylic acid, lactone thereof, e.g. pivalolactone, diol, dicarboxylic acid and/or polyester produced therefrom.

In the following description therefore, by the term HB polymer we mean not only 3-hydroxybutyrate homopolymer, but also copolymers as described above, provided that the 3-hydroxybutyrate residues from at least 40 mole %, and preferably at least 80 mole %, of the polymer chain.

In the production of some shaped articles, such as fibres, ribbons, films, and bottles, it is often desired to induce a degree of orientation into the product.

Conventional orientation techniques involve
(a) forming an amorphous preform and then subjecting the preform to tensile stress, e.g. uni- or bi-axially, usually at a temperature above, but near to, the glass transition temperature, Tg, to cause the preform to yield and draw.
(b) drawing a crystalline preform at a temperature below, but near to, the crystalline melting point, Tm.

Technique (a) is often adopted for polyesters, e.g. polyethylene terephthalate, and polyamides e.g. poly hexa methylene adipamide (Nylon 66) and polycaprolactam (Nylon 6), whereas technique (b) is often adopted for olefin polymers, e.g. polypropylene and polyethylene.

We have found that orientation of HB polymers by these techniques is difficult: the conditions for the production of a suitable preform and for drawing are critical and difficult to reproduce consistently. In general the preforms are brittle, even at elevated temperatures, and tend to break before they yield and orient.

We have now found that orientation of an HB polymer preform can be achieved if, at the time of drawing, the HB polymer is in a partially crystallised state.

If, at the time of drawing, the HB polymer is too highly crystallised, then the preform is brittle and can only be drawn to a very small extent before it breaks, i.e. the elongation to break is low. On the other hand, if, at the time of drawing, the HB polymer has a degree of crystallinity below that at which it becomes brittle, then the preform can be drawn without breaking but is rubbery and, on release of the drawing force, the product relaxes almost completely. Relaxation can be prevented by effecting further crystallisation of the HB polymer, while maintaining the drawing force, until the HB polymer becomes non-rubbery. However, we have found that if the degree of crystallinity at the time of drawing is too low, the drawn product breaks during the further crystallising step. Also, if the degree of crystallinity is too low, the polymer tends to be sticky thus creating handling difficulties.

Thus if the HB polymer has a crystallinity within a certain range at the time of drawing, oriented products can be obtained.

Accordingly the present invention provides a process for the production of an oriented shaped article from an HB polymer comprising uni- or bi-axially drawing a preform of said HB polymer in a partially crystalline state at a temperature between the glass transition temperature, Tg, and the melting point of the HB polymer into said shaped article, and then increasing the degree of crystallinity of the HB polymer by subjecting the drawn preform, while in the drawn condition, to a temperature between the glass transition temperature and the drawing temperature until the drawn article is non-rubbery, the amount of said uni- or bi-axial drawing being such that, after said step of increasing the degree of crystallinity, at least one dimension of the preform has increased by at least 200%, said HB polymer having a degree of crystallinity at the time of drawing, such that the preform is not so brittle that it breaks before achieving said increase in said at least one dimension, and such that the drawn article does not break during the step of increasing the degree of crystallinity.

3-hydroxybutyrate homopolymer has a melting point of about 180° C. and the Tg of the amorphous polymer is about 0° to 5° C. HB copolymers, e.g. containing 3-hydroxyvalerate units, have lower melting points than the HB homopolymer and often have a lower Tg. The melting point of the HB copolymer will depend on the proportion of comonomer units: for example a copolymer containing about 25 mole % of 3-hydroxyvalerate units may have a melting point of the order of 130° C.

Since HB polymers crystallise rapidly at temperatures above room temperature, measurement of the precise degree of crystallinity at the time of drawing is not practical on a routine basis. Also the crystallinity range within which orientation can be achieved may vary, depending on the molecular weight of the polymer and/or the nature, proportion, and distribution of any comonomer units in the polymer, and/or on the nature and amount of any nucleating agent added to the polymer, and/or on the drawing conditions, e.g. draw ratio, rate of drawing, drawing temperature.

The appropriate conditions for satisfactory drawing can, however, be determined by simple experimentation.

The preform containing the HB polymer in the requisite crystalline state can conveniently be produced by subjecting an amorphous preform to crystallisation inducing conditions, e.g. heating to, or maintaining at, a temperature between Tg and the melting point, preferably within ±30° C. of the temperature at which the rate of crystallisation is a maximum (for most HB polymers, including HB homopolymer, this is about 70° C.) for a suitable period of time. For example the HB polymer can be melt extruded, through a suitable die, to an amorphous preform which is passed through a quenching/crystallisation zone, e.g. a bath of a suitable liquid, maintained at a temperature below the melting point of the HB polymer so as to solidify the extruded preform and to effect crystallisation. Since, as mentioned hereinbefore, HB polymers crystallise rapidly at room temperature and above, to prevent too much further crystallisation occurring after leaving the quenching/crystallisation zone, the preform is preferably fed directly from said zone to the drawing stage.

In the drawing stage the preform is further heated, if necessary, and subjected to uni- or bi-axial drawing. Preferably the temperature of the preform at the time of drawing is above the temperature of the preform leaving the quenching/crystallisation zone and in particular is between 30° and 80° C. below the melting point of the HB polymer. The degree of draw is such that at least one dimension, i.e. the length in the case of uni-axial drawing or the length and/or breadth in the case of bi-axial drawing, is increased by at least 200%, and preferably by at least 400%.

Since further crystallisation will generally occur while the preform is being transferred from the quenching/crystallisation zone to the drawing stage and during any heating in the drawing stage preparatory to drawing, the degree of crystallisation at the time of drawing will generally be above that of the preform leaving the quenching/crystallisation zone. Accordingly the time taken for said transfer and heating (if any) preparatory to drawing should be sufficiently short, and the amount of crystallisation induced in the quenching/crystallisation zone such that the degree of crystallisation at the time of drawing is within the range at which orientation can be induced.

While the drawn preform is in the drawn condition, e.g. held under tension, further crystallisation is induced, conveniently by passing the drawn preform through a zone maintained at a temperature between Tg and the drawing temperature. Conveniently this further crystallisation zone is maintained at a temperature within ±20° C. of the temperature at which the rate of crystallisation is a maximum. This further crystallisation is conducted until the HB polymer becomes non-rubbery, i.e. so that, on release of the tension, the degree of relaxation is less than 10% of the drawn value of said at least one dimension that has been increased in said drawing stage by at least 200%. Generally the degree of crystallisation of the drawn preform, after said further crystallisation step will be of the order of 70% or more.

In some cases it may be advantageous to permit some relaxation of the drawn preform during passage through the further crystallisation zone. However the maximum amount of relaxation permitted should be such that, after said drawing and further crystallisation steps, at least one dimension of the preform has been increased by at least 200%. Preferably the amount of relaxation permitted during the further crystallisation step is less than 10% of the drawn value (but before any such relaxation) of said at least one dimension that has been increased by at least 200%.

The present invention is further illustrated by the following examples in which the apparatus shown diagrammatically in the accompanying drawing was employed. The HB polymer was a 3-hydroxybutyrate homo-polymer, hereinafter PHB, produced by aerobic cultivation of *Alcaligenes eutrophus* mutant S301/C5 (NCIB 11599) on glucose. The PHB was isolated by extraction from the aqueous cell suspension with 1,2-dichloroethane at room temperature followed by separation of the solvent layer, containing the dissolved PHB, from the aqueous layer by decanting. The solution was filtered and then the PHB was precipitated by adding the solution to a methanol/water mixture. The precipitated PHB was separated by filtration, washed with methanol and dried. The dried polymer was formed into a paste with about 10% by weight of chloroform and 1% by weight of finely divided boron nitride was added as a nucleating agent. The paste was granulated by passage through a domestic mincer at room temperature. The granules were then dried in an oven to remove the chloroform and melt extruded at 190° C. and regranulated. The PHB had a weight average molecular weight of 300,000 and a melting point of 176° C.

The PHB granules were melt extruded, at a melt temperature of 185° C. at a rate of 0.28 g/min through a die (1) having a circular orifice of diameter 1.585 mm.

The molten extrudate (2) was led directly into a bath (3) of water maintained at 60° C. and guided through bath (3) by guides (4, 5). The resultant solidified monofilament (6) was hauled-off at a rate of 0.026 m/sec by a haul-off roller (7) and passed round a pin (8) heated to 120° C. From the pin (8) the monofilament was drawn into a fibre (9) by a second haul-off roller (10). A plate (11) of length 20 cm maintained at 60° C. was positioned immediately below fibre (9) and between pin (8) and haul-off roller (10). From haul-off roller (10) the fibre (9) was wound up on a reel (12). Heated plate (11) thus provided a heated zone above plate (11) wherein the fibre (9) drawn from pin (8) could be further crystallised. Heated pin (8) served not only to heat the monofilament preform (6) to the drawing temperature, but also to localise the drawing position. The draw ratio was thus the ratio of the circumferential speeds of rollers (10) and (7).

By varying the positions of the guides (4, 5) in the bath (3) the length of time (hereinafter termed the quenching time) that the monofilament (6) was in the water bath (3) could be altered: in turn this varied the degree of crystallisation of the monofilament (6) at the time of drawing, i.e. at the time the fibre left pin (8). The total elapsed time from the extrudate (2) leaving die (1) to the fibre leaving pin (8) is hereinafter termed the conditioning time.

For a number of different quenching times (and hence differing conditioning times), the draw ratio was gradually increased until the fibre broke. The mechanical properties of fibres obtained at this maximum draw ratio was measured. The results are shown in the following table.

| Run No. | Quench time (sec) | Conditioning time (sec) | Max. draw ratio | Tenacity (M Pa) | Extension to Break (%) |
|---|---|---|---|---|---|
| 1.1 | 1 | 5 | * | — | — |
| 1.2 | 4 | 8 | 8.0 | 188 | 30 |
| 1.3 | 4.5 | 8.5 | 7.4 | 180 | 45 |
| 1.4 | 5 | 9 | 7.6 | 196 | 42 |
| 1.5 | 6 | 10 | 8.0 | 209 | 40 |
| 1.6 | 20 | 24 | 1.1 | 27 | 8 |

*The polymer was sticky and stuck to the haul-off roller 7 and pin 8 preventing satisfactory drawing.

In our European Patent Specification No. 78609 (corresponding to U.S. Ser. No. 434,229) we described a process for the orientation of HB polymers in which the polymer preform is subjected to a compression step, e.g. cold rolling, prior to drawing. No such compression step need be employed in the process of the present invention.

I claim:

1. A process for the production of an oriented shaped article from a polymer containing at least 40 mole % of 3-hydroxybutyrate residues in the polymer chain comprising uni- or bi-axially drawing a preform of said hydroxybutyrate polymer in a partially crystalline state at a temperature between the glass transition temperature, Tg, and the melting point of the hydroxybutyrate polymer into said shaped article, and then increasing the degree of crystallinity of the hydroxybutyrate polymer by subjecting the drawn preform, while in the drawn condition, to a temperature between the glass transition temperature and the drawing temperature until the drawn article is nonrubbery, the amount of said uni- or bi-axial drawing being such that, after said step of increasing the degree of crystallinity, at least one dimension of the preform has increased by at least 200%, said hydroxybutyrate polymer having a degree of crystallinity, at the time of drawing, such that the preform is not so brittle that it breaks before achieving said increase in said at least one dimension, and such that the drawn article does not break during the step of increasing the degree of crystallinity.

2. A process as claimed in claim 1 wherein the partially crystalline hydroxybutyrate polymer preform is produced by subjecting an amorphous HB polymer preform to a temperature within 30° C. of the temperature at which the rate of crystalisation of the hydroxybutyrate polymer is a maximum.

3. A process as claimed in claim 1 wherein the hydroxybutyrate polymer is melt extruded into the desired configuration to form an amorphous preform which is then passed through a quenching/crystallisation zone maintained at a temperature below the melting point of the hydroxybutyrate polymer to solidify the polymer and to effect the desired degree of crystallisation.

4. A process as claimed in claim 3 wherein the preform is fed directly from said quenching/crystallisation zone to the drawing stage.

5. A process as claimed in claim 1 wherein the drawing is conducted at a temperature above that at which the preform is partially crystallised.

6. A process as claimed in claim 1 wherein the drawing is conducted at a temperature between 30° and 80° C. below the melting point of the hydroxybutyrate polymer.

7. A process as claimed in claim 1 wherein the degree of crystallinity of the drawn preform is increased by subjecting the drawn preform to a temperature within 20° C. of the temperature at which the rate of crystallisation is a maximum.

8. A process as claimed in claim 1 wherein the drawn preform is allowed to relax, during the further crystallisation step, by up to 10% of the drawn value, of the at least one dimension that has been increased by at least 200% during the drawing step.

* * * * *